United States Patent
Huang et al.

(10) Patent No.: US 8,452,067 B2
(45) Date of Patent: May 28, 2013

(54) METHOD FOR GENERATING BONE MASK

(75) Inventors: Hui-Yang Huang, Taipei (TW);
Chung-Yi Yang, Kaohsiung (TW);
Chung-Wei Lee, Taipei (TW);
Hon-Man Liu, Taipei (TW)

(73) Assignee: National Central University, Jhongli (TW)

( * ) Notice: Subject to any disclaimer, the term of this patent is extended or adjusted under 35 U.S.C. 154(b) by 325 days.

(21) Appl. No.: 13/051,426

(22) Filed: Mar. 18, 2011

(65) Prior Publication Data
US 2012/0121147 A1    May 17, 2012

(30) Foreign Application Priority Data
Nov. 15, 2010    (TW) ................ 99139137 A

(51) Int. Cl.
*G06K 9/00*    (2006.01)
(52) U.S. Cl.
USPC ............................................. 382/131
(58) Field of Classification Search
USPC ............... 382/131; 378/4, 6, 8, 12, 21–23, 378/25; 348/77
See application file for complete search history.

(56) References Cited

U.S. PATENT DOCUMENTS

| | | | | |
|---|---|---|---|---|
| 6,373,920 | B1* | 4/2002 | Hsieh | 378/98.11 |
| 6,891,918 | B2* | 5/2005 | Drummond et al. | 378/5 |
| 7,371,365 | B2* | 5/2008 | Poduslo et al. | 424/9.34 |
| 2005/0163358 | A1* | 7/2005 | Moeller | 382/128 |
| 2005/0180541 | A1* | 8/2005 | Avinash et al. | 378/5 |
| 2008/0118127 | A1* | 5/2008 | Sirohey et al. | 382/130 |
| 2008/0298656 | A1* | 12/2008 | Yim et al. | 382/128 |
| 2008/0304728 | A1* | 12/2008 | Licato et al. | 382/131 |
| 2010/0278405 | A1* | 11/2010 | Kakadiaris et al. | 382/131 |
| 2011/0054656 | A1* | 3/2011 | Lee et al. | 700/98 |

* cited by examiner

*Primary Examiner* — Jason M Repko
*Assistant Examiner* — Shervin Nakhjavan
(74) *Attorney, Agent, or Firm* — Wang Law Firm, Inc.; Li K. Wang; Stephen Hsu

(57) ABSTRACT

The present invention discloses a method for generating a bone mask. The method comprises the following steps: performing a noncontrast computed tomography scan on a subject in axial mode to get a first data set; after the subject injected with a contrast medium, performing a postcontrast computer tomography angiography scanning on the subject in helical mode to get a second data set; reconstructing the two mentioned data set to acquire a first reconstruction image and a second reconstruction image respectively; resampling the first reconstruction image based on the second reconstruction image by using a computer to get a third reconstruction image; and thresholding values of data which are greater than or equal to a scheduled Hounsfield unit in the third reconstruction image to get a bone mask.

18 Claims, 21 Drawing Sheets

---

Performing a noncontrast axial computed tomography (CT) scan on a subject to acquire a first data set — S11

Performing a postcontrast helical CT scan on the subject after the subject injected with a contrast medium to acquire a second data set — S12

Reconstructing the first data set and the second data sets to acquire a first reconstruction image and a second reconstruction image respectively — S13

Resampling the first reconstruction image based on the second reconstruction image to acquire a third reconstruction image — S14

Thresholding values of data which are equal to or greater than a scheduled Hounsfield Unit (HU) in the third reconstruction image to acquire a bone mask — S15

METHOD FOR GENERATING BONE MASK

BACKGROUND OF THE INVENTION

1. Field of the Invention

The present invention relates to the field of computed tomography (CT) scan, and more specifically to a method for generating a bone mask by utilizing the images from the standard nonenhanced CT in axial mode scan.

2. Description of Related Art

Being a well-established and fully developed technique, computed tomography angiography (CTA) can be used for the detections of cerebral aneurysms, artery stenoses and other vascular anomalies. Comparing to the conventional angiography, this technique is less invasive. Furthermore, comparing to the magnetic resonance angiography (MRA), CTA has the advantage of having a shorter examination time, a lower cost and loosened screening criteria for patient suitability. Therefore, in the acute setting, CTA is performed frequently for diagnosing vascular diseases. Although three-dimensional visualization and computer-aided analytic techniques such as maximum intensity projection (MIP), volume rendering and arterial lumen analysis are readily available, fully automated image processing for CTA data in the brain has been hampered by the presence of surrounding bony structures, particularly in the region of the skull base. For this reason, radiologists must resort to a time-consuming fundamental 2-dimensional sectional image evaluation for vessels surrounded by bone.

When the value of Hounsfield unit (HU) for the contrast-enhanced blood vessels following the injection of contrast medium falls within the HU range of the bone and the calcification, diagnosis by computed tomography angiography becomes more difficult. Radiologists and radiation physicists have already proposed many methods to remove bone structures or extract out vessels from the CTA source images, including using subtraction CTA, manual or automated bone editing, matched mask bone elimination (MMBE), vessel segmentation and dual energy CTA.

Subtraction CTA is the simplest method, this involves using the data acquired from the additional, precontrast helical computed tomography (CT) scan as a reference. This reference was then subtracted from the data acquired from the postcontrast helical CT scan to produce contrast-enhanced images. However, subtraction CTA has the following two shortcomings: (1) the radiation dose in which the subject was exposed to, doubled as the result of the additional precontrast helical CT scan; (2) the angiography images with added noise (caused by subtraction operations). Conversely, even though bone editing and vessel segmentation methods do not require any additional, precontrast CT scan, these methods involves drawbacks of having a certain degree of computational complexity and having significant differences in results edited by different operators.

Matched mask bone elimination (MMBE) is currently the most common approach being used, which also requires an additional, precontrast helical CT scan in order to acquire the data for bone structure elimination. Compared with subtraction CTA, the advantage of using this approach is that the additional scan can be carried out by using only a quarter of the standard radiation dose. This technique generates a bone mask by simple thresholding on the low dose precontrast data, and then eliminates the bone in the data of the postcontrast helical CT scan by matching the bone mask back. Evidence from previous studies also points out that CT angiography with matched mask bone elimination is a technique that accurately detects intracranial aneurysms.

In a standard clinical procedure today, patients with symptoms of acute stroke would first undergo a noncontrast CT scan to determine the types of stroke: cerebral infarction, primary intracerebral hemorrhage or subarachnoid hemorrhage. Although multidetector CT can generate noncontrast helical CT images that are as good as axial CT images in terms of quality, the noncontrast CT scan is constantly done in axial mode to avoid helical scanning artifacts. Therefore, this invention provides a method for generating a bone mask by utilizing the images from the standard nonenhanced CT in axial mode scan. When a patient had received the nonenhanced CT in axial mode scan for diagnosis, the resulting data from the scan can be used repeatedly to generate the bone mask required for helical CT angiography, thereby reducing the total radiation dose that a patient exposed to.

SUMMARY OF THE INVENTION

In view of the problems of prior techniques as aforementioned, one objective of the present invention is to provide a method for generating a bone mask. The bone mask is then used for eliminating the corresponding bone structures in the postcontrast helical CT images in order to further resolve the problem of viewing obstruction caused by bone structures for blood vessels and other organs and tissues, and get bone-free images.

The aim of the present invention is to propose a method for generating a bone mask, which comprises the following steps. A noncontrast computed tomography scan is performed on a subject in axial mode to get a first data set. The subject is injected with a contrast medium, and then a postcontrast computer tomography angiography scanning is performed on the subject in helical mode to get a second data set. The two mentioned data set is reconstructed to acquire a first reconstruction image and a second reconstruction image respectively, in which the second reconstruction image possesses a predetermined spatial resolution. The first reconstruction image is resampled based on the second reconstruction image by using a computer to get a third reconstruction image, such that the third reconstruction image matches the predetermined spatial resolution of the second reconstruction image. A bone mask is acquired by thresholding values of data which are greater than or equal to a scheduled Hounsfield unit in the third reconstruction image.

The method as aforementioned can further comprise the following steps: registering the second reconstruction image and the third reconstruction image to overlap the second reconstruction image and the third reconstruction image, such that the transformation parameters/matrix for registration is acquired and then is used for registering and overlapping the bone mask and the second reconstruction image.

Within the above steps, the method can further include a step of subtracting the data matched with the registered bone mask in the second reconstruction image to acquire a bone-free reconstruction image.

In addition, the method can further include the following steps. The registered bone mask is analyzed by computer simulation to acquire a bone mask data set in the form of raw data as collected by a CT scanner. The bone mask data set is subtracted from the second data set to generate a bone-free data set. The bone-free data set is reconstructed to acquire the bone-free reconstruction image.

Moreover, the predetermined spatial resolution is defined by the predetermined pixel size, by the slice thickness and by the pattern corresponding to the pixel.

In the thresholding step, the periphery of the bone mask can be color-marked.

As stated above, the method for generating a bone mask as proposed in this invention possesses one or several of the following advantages:

(1) The invention as presented herein utilizes the images acquired from noncontrast axial CT scan, which is primarily used for CT diagnosis, to generate a bone mask. This means that no additional noncontrast CT scan is required, and enables a further reduction of radiation dose that a patient is exposed to.

(2) Due to the fact that axial CT possesses an advantage over helical CT in producing less computational artifacts. Therefore, the bone-free images acquired by utilizing the bone mask that generated by the present invention is able to have better and clearer image quality. In a preferred embodiment, in the thresholding step, the periphery of the bone mask is color-marked. This helps to define the range of the bone mask more accurately. When the bone mask generated by the present invention is used to eliminate the corresponding bone structures from the data of postcontrast helical CT scan, a problem in earlier techniques that the vessels in an angiography image are smaller than the real vessels can be overcome, so that a more accurate angiography image is presented.

(3) The present invention can further reduce the total radiation dose that a patient is exposed to, and is thereby more suitable than the prior art to use on subjects who are radiation-sensitive and prone to side effects of radiation (e.g. children).

DETAILED DESCRIPTION OF THE PREFERRED EMBODIMENTS

Figure 1:
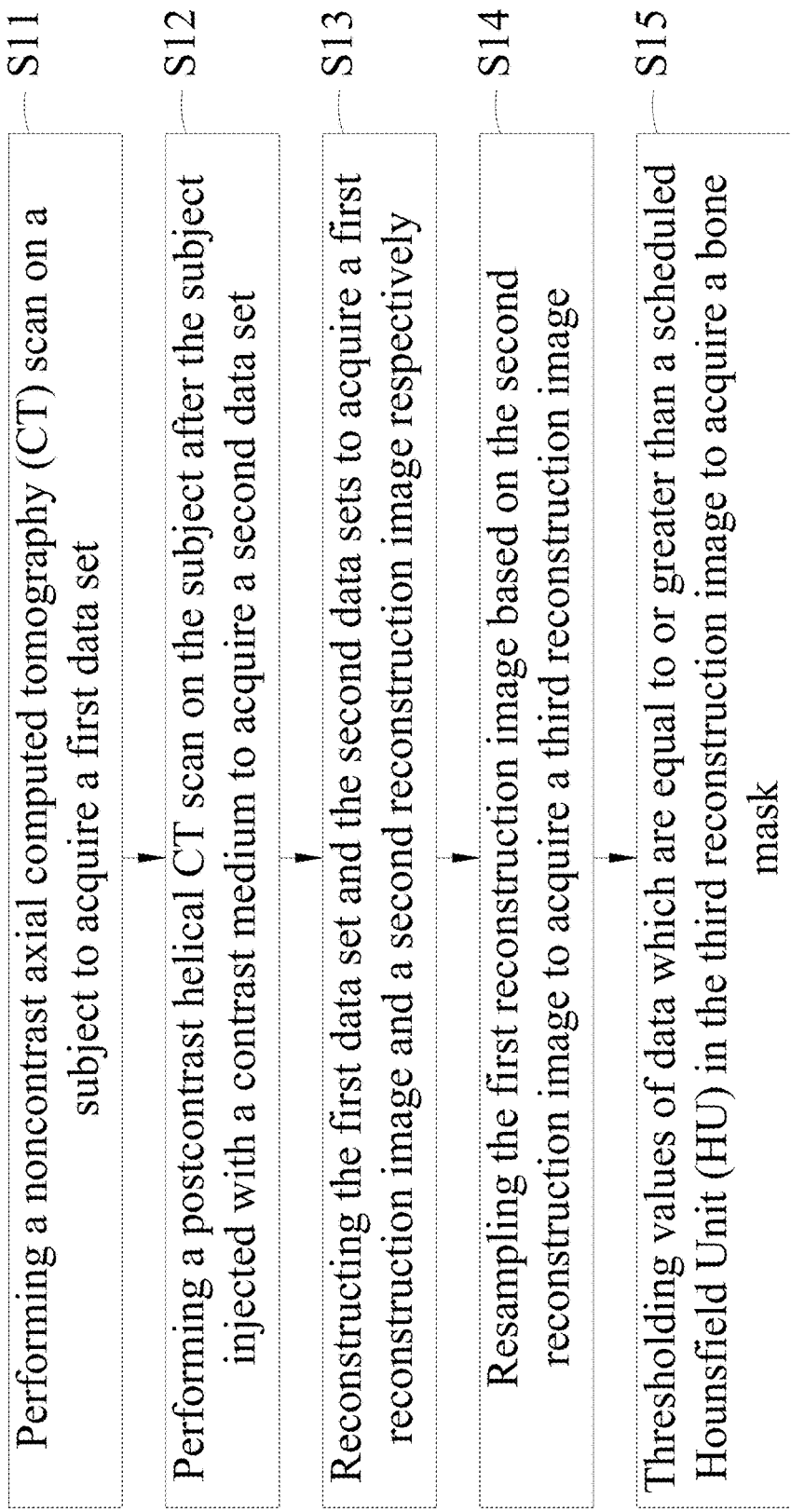
FIG. 1 is a flowchart of a first embodiment of the present invention.

Please refer to FIG. 1, it is a flowchart of a first embodiment of the present invention. As indicated by step S11 in the figure, a first data set is acquired by performing a noncontrast (nonenhanced) axial computed tomography (CT) scan on a subject. As indicated by step S12, a second data set is acquired by performing a postcontrast helical CT scan on the subject after the subject injected with a contrast medium. The contrast medium comprises an iodinated contrast medium. As indicated by the step S13, the first data set and the second data set are reconstructed to acquire a first reconstruction image and a second reconstruction image respectively, in which the second reconstruction image possesses a predetermined spatial resolution. The predetermined spatial resolution may be defined by the predetermined pixel size, by the slice thickness and by the pattern corresponding to the pixel. Once reconstructed, the reconstruction images reveal internal features of a patient. As indicated by step S14, a third reconstruction image is acquired by resampling the first reconstruction image based on the second reconstruction image, such that the third reconstruction image matches the predetermined spatial resolution of the second reconstruction image. As indicated by the step S15, a bone mask is generated by thresholding values of data which are equal to or greater than a scheduled Hounsfield Unit (HU) in the third reconstruction image. The scheduled Hounsfield unit may be in the range of 150 to 300 HU, which is applied to identify the bone pixels. Furthermore, the periphery of the bone mask may be color-marked to define the range of the bone mask more accurately.

Figure 2:
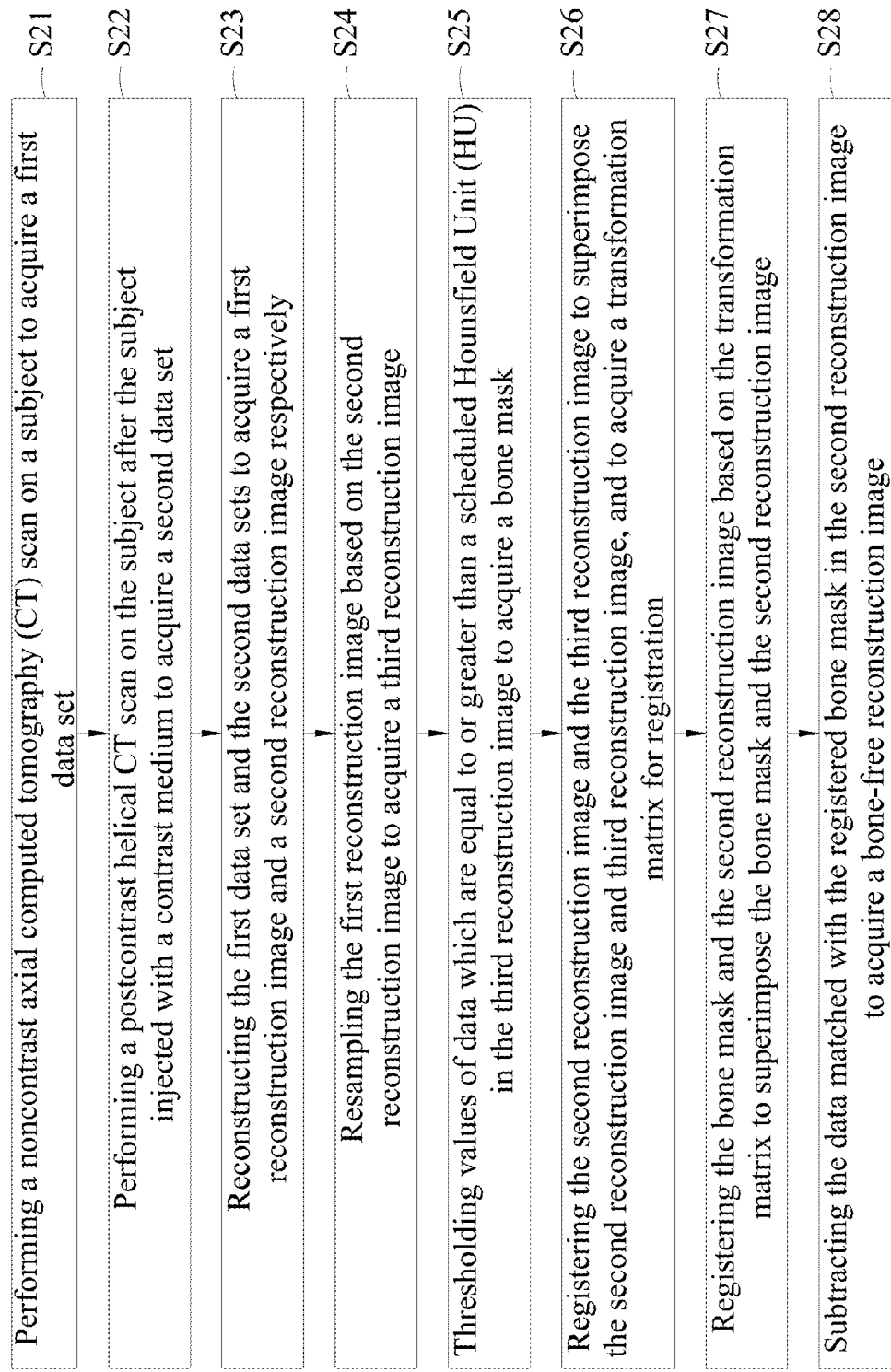
FIG. 2 is a flowchart of a second embodiment of the present invention.

Please refer to FIG. 2, it is a flowchart of a second embodiment of the present invention. As shown in the figure, in the step S21, a first data set is acquired by performing a noncontrast axial computed tomography (CT) scan on a subject. In the step S22, a second data set is acquired by performing a postcontrast helical CT scan on the subject after the subject injected with a contrast medium. As indicated by the step S23, the first data set and the second data set are reconstructed to acquire a first reconstruction image and a second reconstruction image respectively, in which the second reconstruction image possesses a predetermined spatial resolution. As indicated by the step S24, a third reconstruction image is acquired by resampling the first reconstruction image based on the second reconstruction image, such that the third reconstruction image matches the predetermined spatial resolution of the second reconstruction image. As indicated by the step S25, a bone mask is generated by thresholding values of data which are equal to or greater than a scheduled Hounsfield Unit (HU) in the third reconstruction image. In the step S26, the second reconstruction image and the third reconstruction image is registered to superimpose the second reconstruction image and third reconstruction image, and to acquire a transformation matrix for registration. As indicated by the step S27, the bone mask and the second reconstruction image is registered based on the transformation matrix to superimpose the bone mask and the second reconstruction image. In the step S28, a bone-free reconstruction image is acquired by subtracting the data matched with the registered bone mask in the second reconstruction image.

Figure 3:
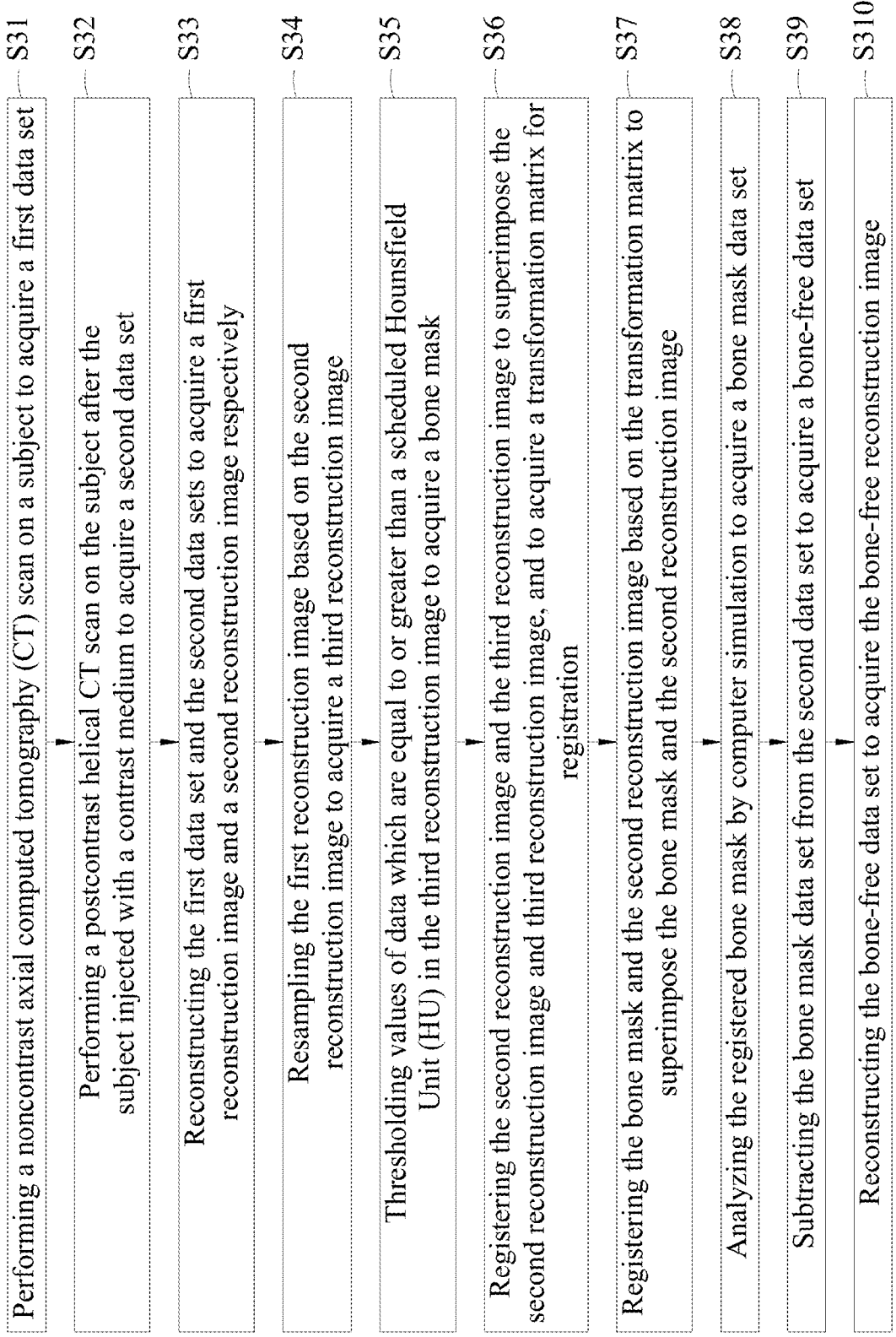
FIG. 3 is a flowchart of a third embodiment of the present invention.

Please refer to FIG. 3, it is a flowchart of a third embodiment of the present invention. As indicated by step S31 in the figure, a first data set is acquired by performing a noncontrast axial computed tomography (CT) scan on a subject. In the step S32, a second data set is acquired by performing a postcontrast helical CT scan on the subject after the subject injected with a contrast medium. As indicated by the step S33, the first data set and the second data set are reconstructed to acquire a first reconstruction image and a second reconstruction image respectively, in which the second reconstruction image possesses a predetermined spatial resolution. In the step S34, a third reconstruction image is acquired by resampling the first reconstruction image based on the second reconstruction image, such that the third reconstruction image matches the predetermined spatial resolution of the second reconstruction image. As indicated by the step S35, a bone mask is generated by thresholding values of data which are equal to or greater than a scheduled Hounsfield Unit (HU) in the third reconstruction image. In the step S36, the second reconstruction image and the third reconstruction image is registered to superimpose the second reconstruction image and third reconstruction image, and to acquire a transformation matrix for registration. As indicated by the step S37, the bone mask and the second reconstruction image is registered based on the transformation matrix to superimpose the bone mask and the second reconstruction image. In the step S38, a bone mask data set (in the CT scanner's raw data form) is acquired by analyzing the registered bone mask via computer simulation. In the step S39, a bone-free data set is acquired by subtracting the bone mask data set from the second data set. As indicated by the step S310, the bone-free data set is reconstructed to acquire the bone-free reconstruction image.

In typical operation of CT scanner, X-ray source projects an X-ray beam from the focal point and toward detector array. The detector is generally formed by a plurality of detector elements that sense the X-rays that pass through and around a region of interest, such as particular body parts. Each detector element produces an electrical signal that represents the intensity of the X-ray beam at the position of the element at the time the beam strikes the detector. Furthermore, the gantry is rotated around the subject of interest so that a plurality of radiographic views may be collected by the computer. Thus, an image or slice is acquired which may incorporate, in certain modes, less or more than 360 degrees of projection data, to formulate an image. The image is collimated to a desired thickness, typically between 0.5 mm and 10 mm using either lead shutters in front of the X-ray source and different detector apertures. The collimator typically defines the size and shape of the X-ray beam that emerges from the X-ray source. Thus, as the X-ray source and the detector rotate, the detector collects data of the attenuated X-ray beams. Data collected from the detector then undergoes pre-processing and calibration to condition the data to represent the line integrals of the attenuation coefficients of the scanned objects. The processed data, commonly called projections, are then filtered and back-projected to formulate an image of the scanned area. When a CT scanner is performed to acquire computer images, there is a continuous memory area within the CT scanner to record the information in images, such as image modality, bits stored, raw data and projection image (also known as sinogram). Wherein, the image data set consists of the projection image data set, which can be reconstructed into a plurality of two-dimension (2D) images via the use of appropriate mathematical operations such as inverse matrix, filtered back-projection and iterative method or 2D Fourier transform. A CT image is composed of a square image matrix (a two-dimensional array) that ranges in size from 256×256 to 1024×1024 picture elements or pixels, in which each pixel represents a CT density value. The unit of measurement for the CT density value is the Hounsfield unit (HU).

Figure 4:
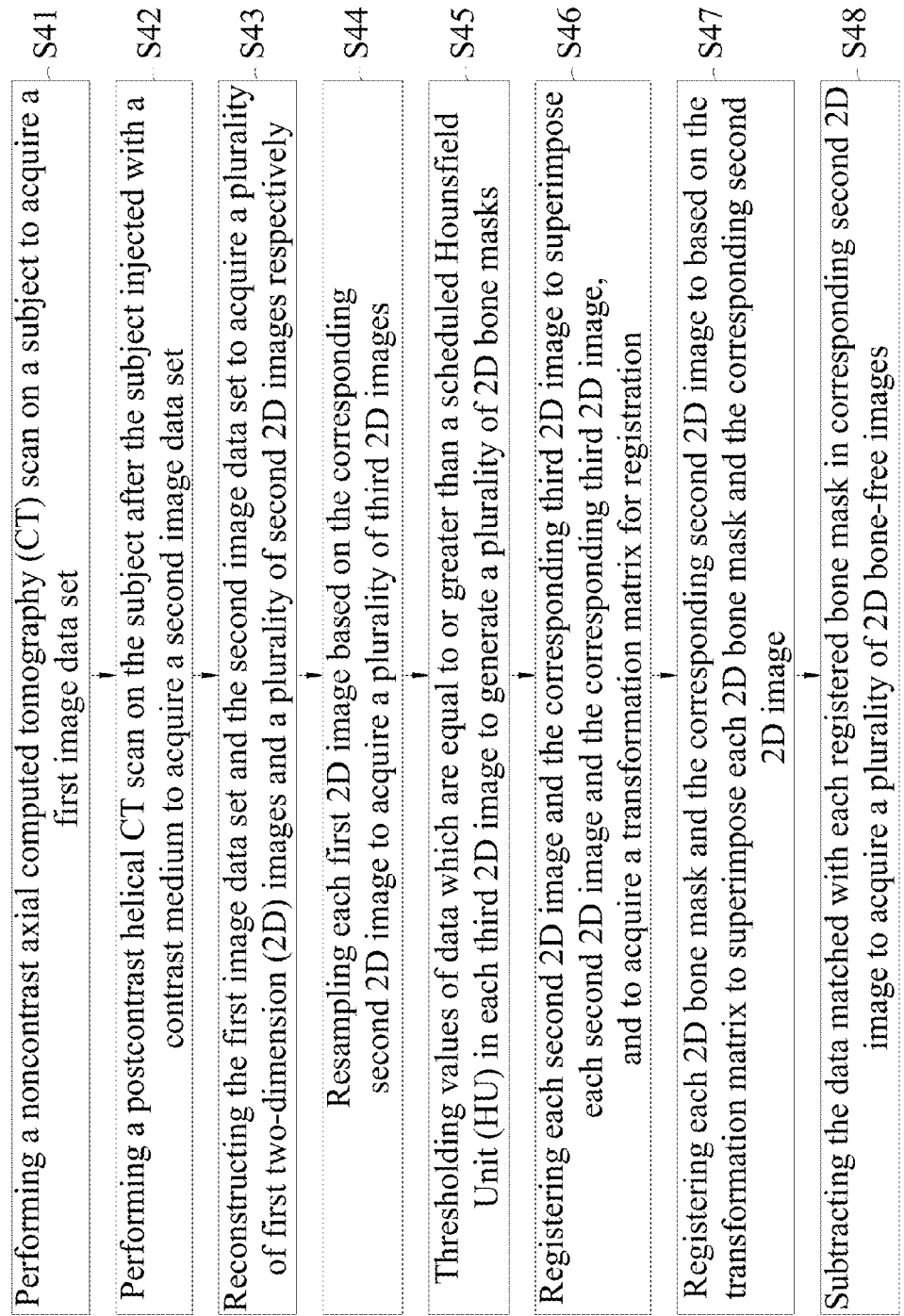
FIG. 4 is a flowchart of a fourth embodiment of the present invention.

As mentioned above, a fourth and a fifth embodiments of the invention presented herein describe the steps and the outcomes when each data set is the said image data set. Please refer to FIG. 4, it is a flowchart of the fourth embodiment of the present invention. As shown in the figure, in the step S41, a first image data set is acquired by performing a noncontrast axial computed tomography (CT) scan on a subject. In the step S42, a second image data set is acquired by performing a postcontrast helical CT scan on the subject after the subject injected with a contrast medium. As indicated by the step S43, the first image data set and the second image data set are reconstructed to acquire a plurality of first two-dimension (2D) images and a plurality of second 2D images respectively, in which each second 2D image possesses a predetermined spatial resolution. In the step S44, a plurality of third 2D images is acquired by resampling each first 2D image based on the corresponding second 2D image, such that each third 2D image matches the predetermined spatial resolution of the corresponding second 2D image. As indicated by the step S45, a plurality of 2D bone masks are generated by thresholding values of data which are equal to or greater than a scheduled Hounsfield Unit (HU) in each third 2D image. In the step S46, each second 2D image and the corresponding third 2D image is registered to superimpose each second 2D image and the corresponding third 2D image, and to acquire a transformation matrix for registration. As indicated by the step S47, each 2D bone mask and the corresponding second 2D image is registered based on the transformation matrix to superimpose each 2D bone mask and the corresponding second 2D image. In the step S48, a plurality of 2D bone-free images is acquired by subtracting the data matched with each registered bone mask in corresponding second 2D image. Such plurality of 2D bone-free images are the angiograms in which bone structure have been eliminated. When the plurality of 2D bone-free images are spatially stacked, a three-dimensional angiogram can be reconstructed.

Figure 5:
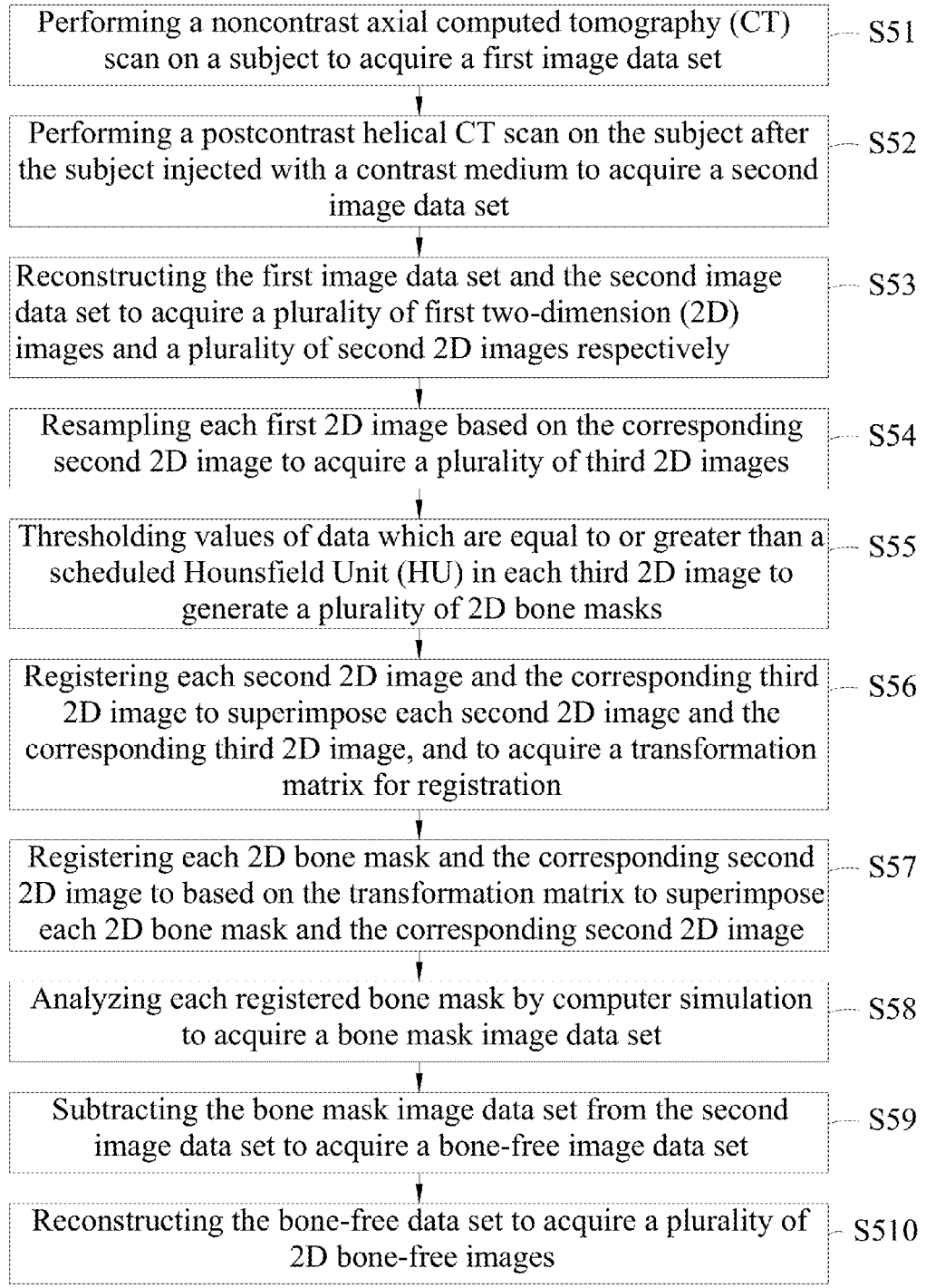
FIG. 5 is a flowchart of a fifth embodiment of the present invention.

Please refer to FIG. 5, it is a flowchart of the fifth embodiment of this invention. As shown in the figure, in the step S51, a first image data set is acquired by performing a noncontrast axial computed tomography (CT) scan on a subject. In the step S52, a second image data set is acquired by performing a postcontrast helical CT scan on the subject after the subject injected with a contrast medium. As indicated by the step S53, the first image data set and the second image data set are reconstructed to acquire a plurality of first two-dimension (2D) images and a plurality of second 2D images respectively, in which each second 2D image possesses a predetermined spatial resolution. In the step S54, a plurality of third 2D images is acquired by resampling each first 2D image based on the corresponding second 2D image, such that each third 2D image matches the predetermined spatial resolution of the corresponding second 2D image. As indicated by the step S55, a plurality of 2D bone masks are generated by thresholding values of data which are equal to or greater than a scheduled Hounsfield Unit (HU) in each third 2D image. In the step S56, each second 2D image and the corresponding third 2D image is registered to superimpose each second 2D image and the corresponding third 2D image, and to acquire a transformation matrix for registration. As indicated by the step S57, each 2D bone mask and the corresponding second 2D image is registered based on the transformation matrix to superimpose each 2D bone mask and the corresponding second 2D image. In the step S58, a bone mask image data set (in the CT scanner's raw data form) is acquired by analyzing each registered bone mask via computer simulation. In the step S59, a bone-free image data set is acquired by subtracting the bone mask image data set from the second image data set. As indicated by the step S510, the bone-free image data set is reconstructed to acquire a plurality of 2D bone-free images. A three-dimensional angiogram can be reconstructed when such plurality of 2D bone-free images are stacked spatially.

Computed tomography (CT) generates images that each image represents a slice of the subject. Since a CT section has a finite thickness, each pixel in the image actually represents a small volume element, or voxel. The size of such voxel depends on the matrix size, the selected field of view (FOV), and the section thickness. A voxel is the smallest unit of tissue volume that can be imaged by a CT scan, and each pixel's (length)×(width)×(slice thickness) are equal to the volume of the corresponding voxel. Same with a pixel, each voxel also represents a density value. The digital data corresponding to the voxels in a 3D image is called a volume data.

Figure 6:
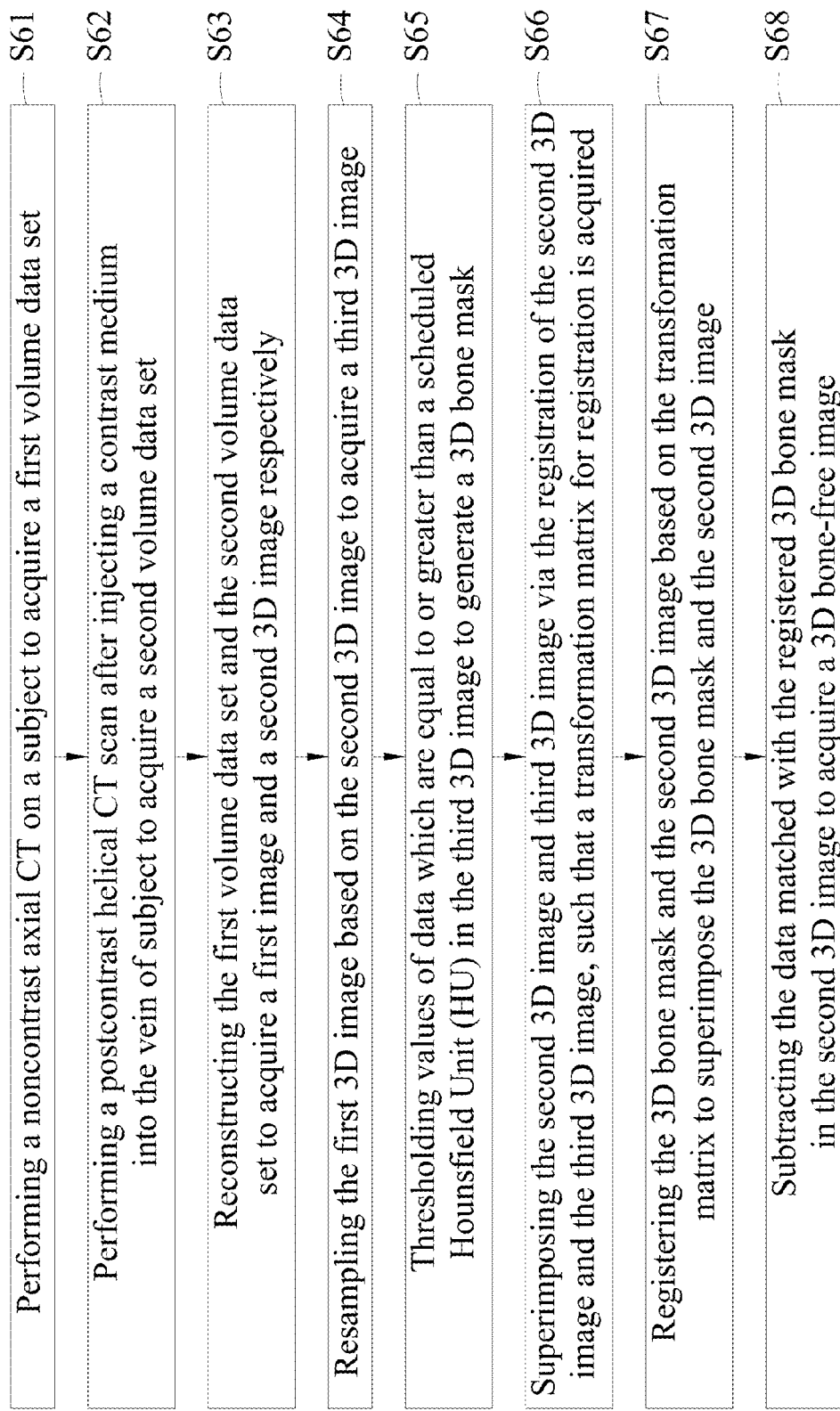
FIG. 6 is a flowchart of a sixth embodiment of the present invention.

Following what is mentioned above, a sixth and a seventh embodiments of the present invention describe what steps and results would be when each mentioned data set is the volume data set. As referred in FIG. 6, the flowchart of the sixth embodiment of the present invention is illustrated. As indicated in step S61 of the figure, a first volume data set is acquired by performing a noncontrast axial CT on a subject. In step S62, a second volume data set is acquired by performing a postcontrast helical CT scan after injecting a contrast medium into the vein of subject. In step S63, a first 3D image and a second 3D image are acquired respectively by reconstructing the first volume data set and the second volume data set, in which the second 3D image possesses a predetermined spatial resolution. In step S64, a third 3D image is acquired by resampling the first 3D image based on the second 3D image, such that the third 3D image matches the predetermined spatial resolution of the second 3D image. As indicated by the step S65, a 3D bone mask is generated by thresholding values of data which are equal to or greater than a scheduled Hounsfield Unit (HU) in the third 3D image. In step S66, the second 3D image and third 3D image are superimposed via the registration of the second 3D image and the third 3D image, such that a transformation matrix for registration is acquired. As indicated by the step S67, the 3D bone mask and the second 3D image are registered based on the transformation matrix to superimpose the 3D bone mask and the second 3D image. In the step S68, a 3D bone-free image is acquired by subtracting the data matched with the registered 3D bone mask in the second 3D image.

Figure 7:
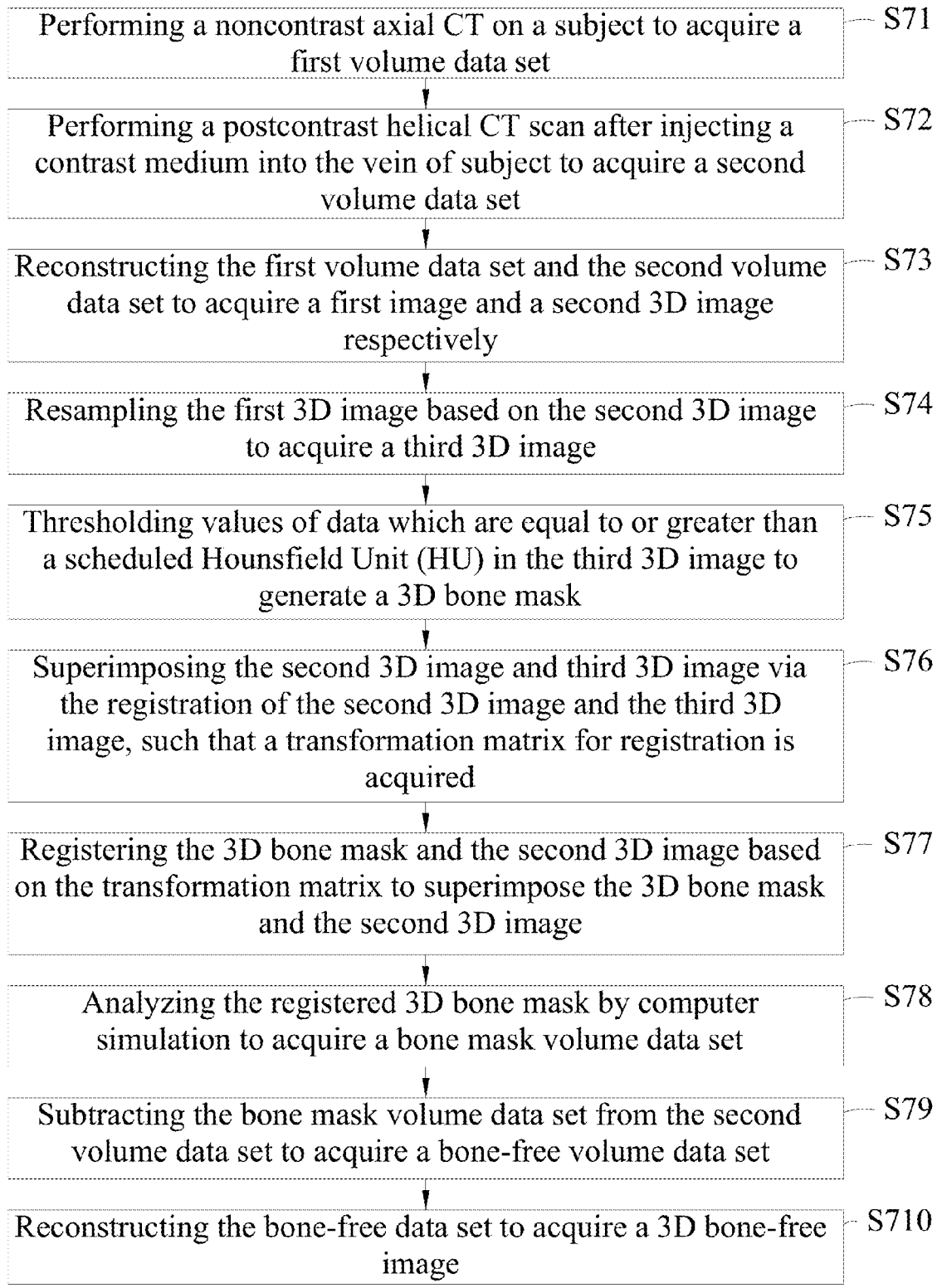
FIG. 7 is a flowchart of a seventh embodiment of the present invention.
Figure 8A:
FIGS. 8A-8D illustrate a comparison between bone masks by overlap analysis that generated by the present invention and by the prior MMBE technique.
Figure 8B:
Figure 8C:
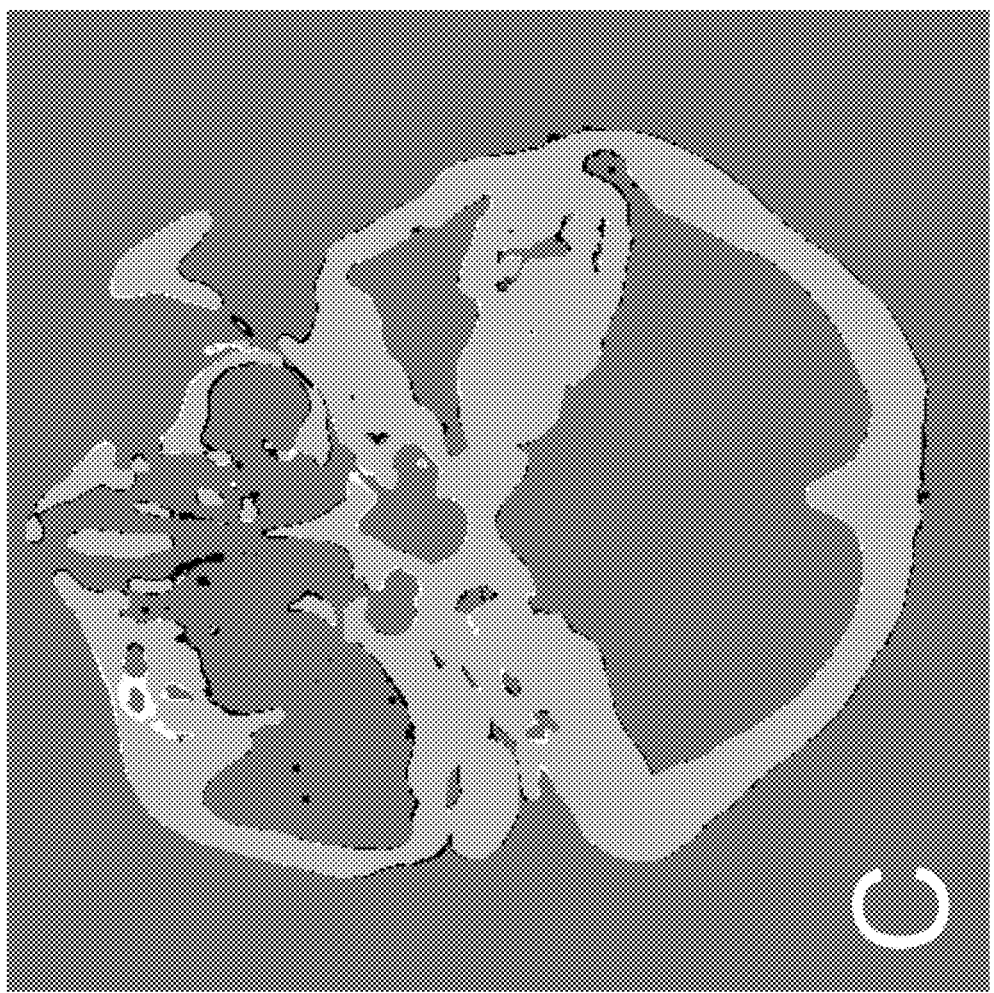
Figure 8D:
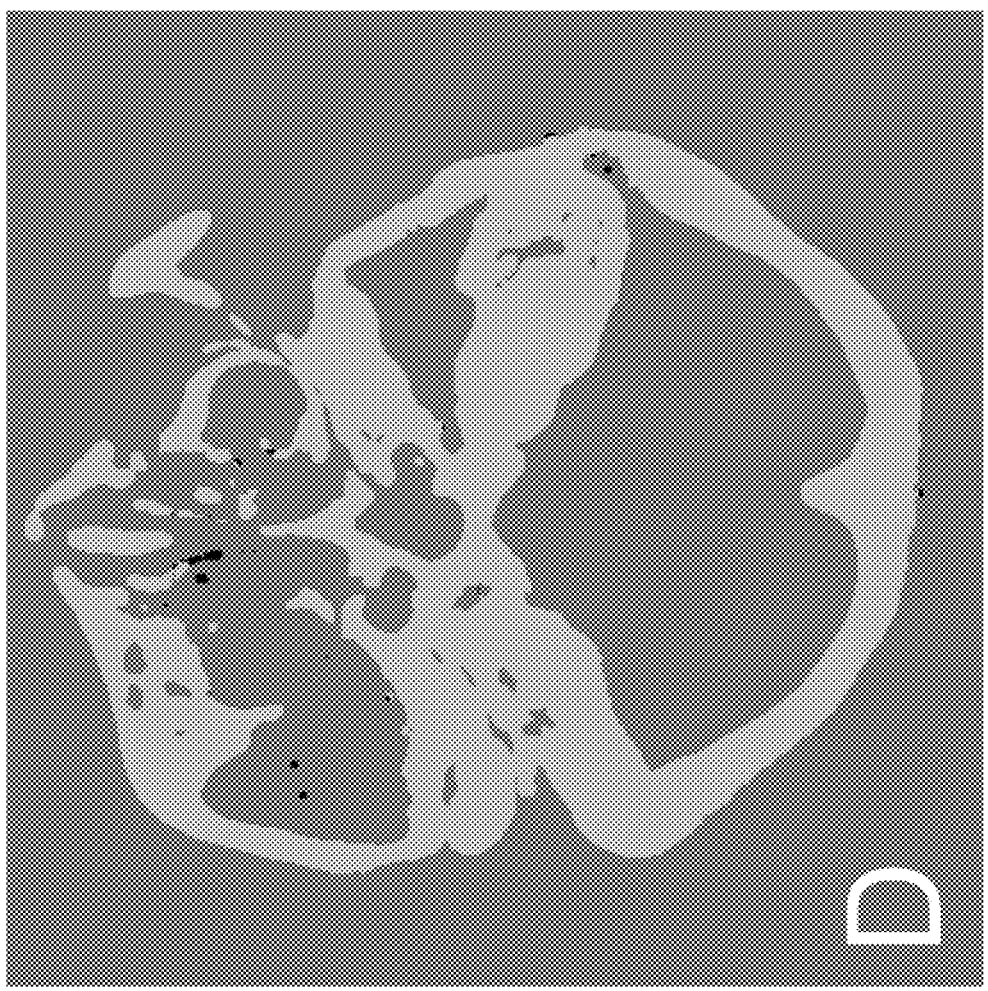
Figure 9A:
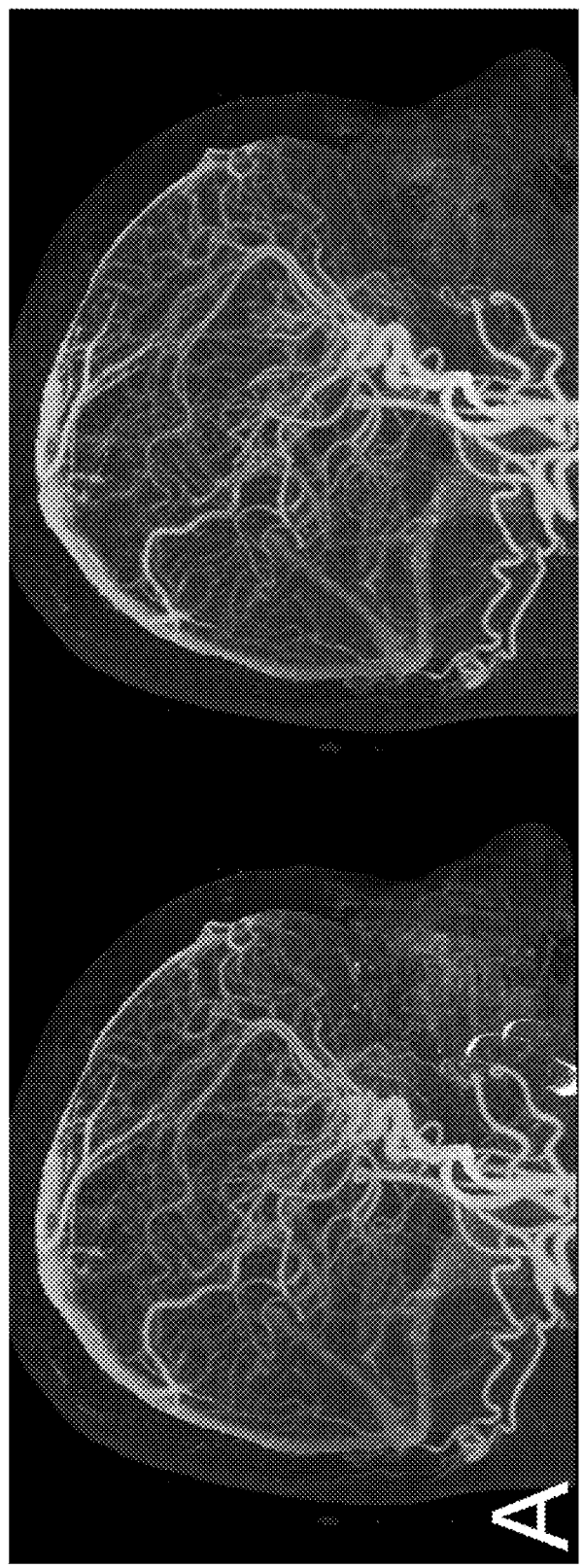
FIGS. 9A-9D illustrate the MIP images of the present invention and the MIP images of the prior MMBE technique viewed in different directions.
Figure 9B:
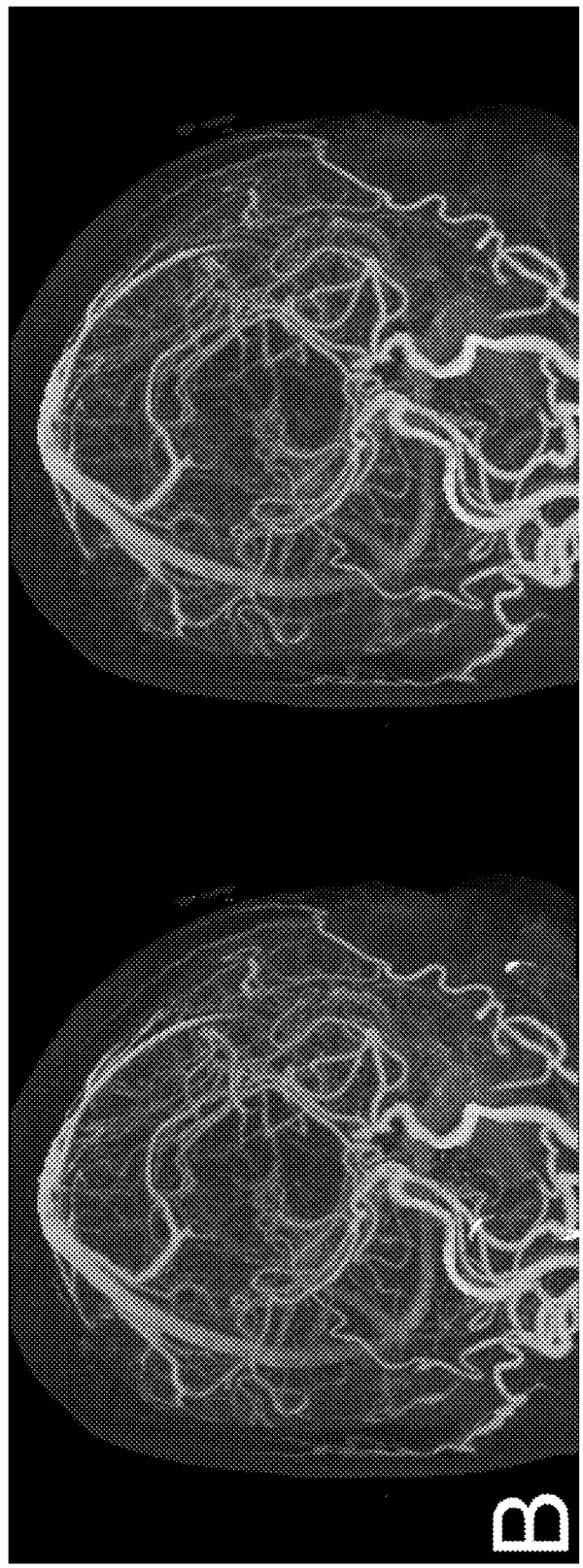
Figure 9C:
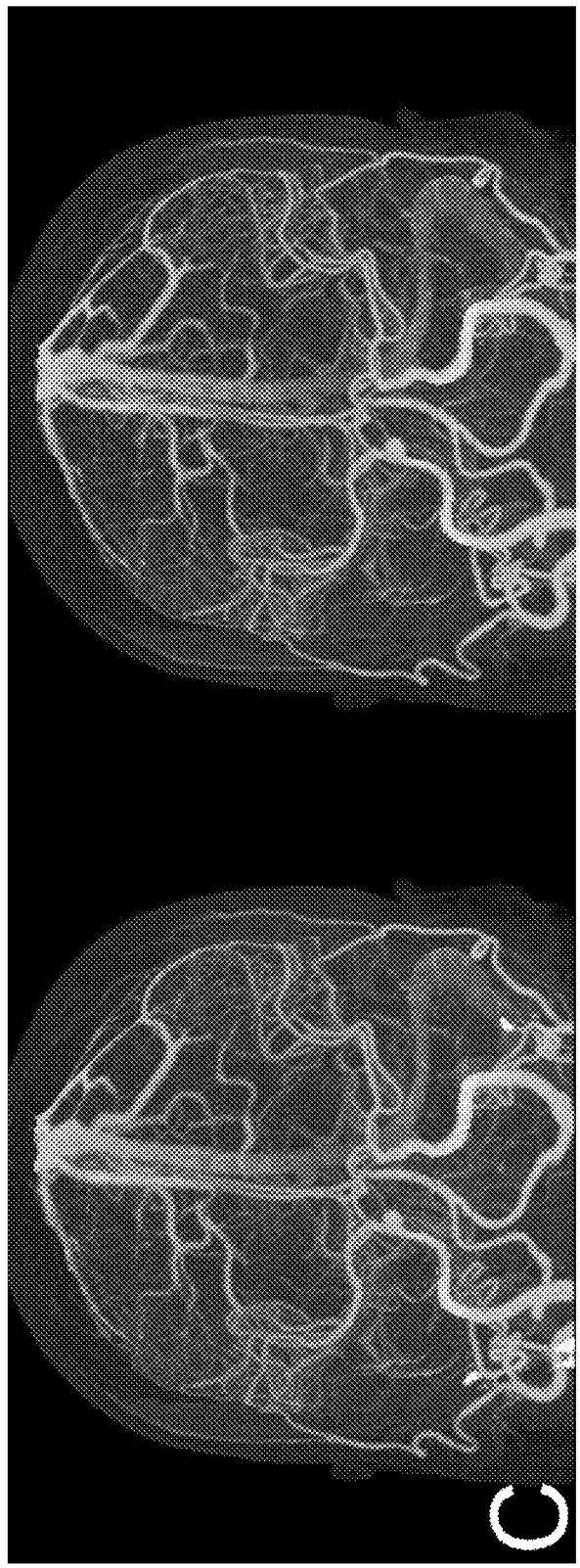
Figure 9D:
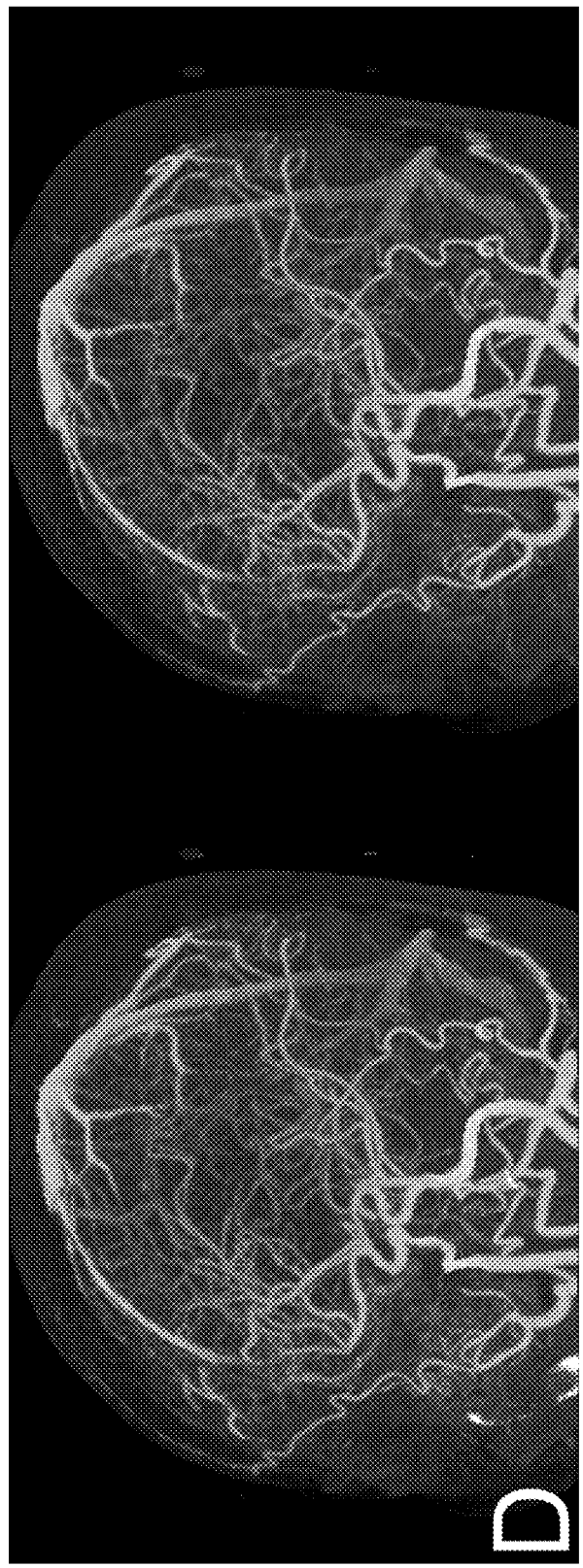
Figure 10A:
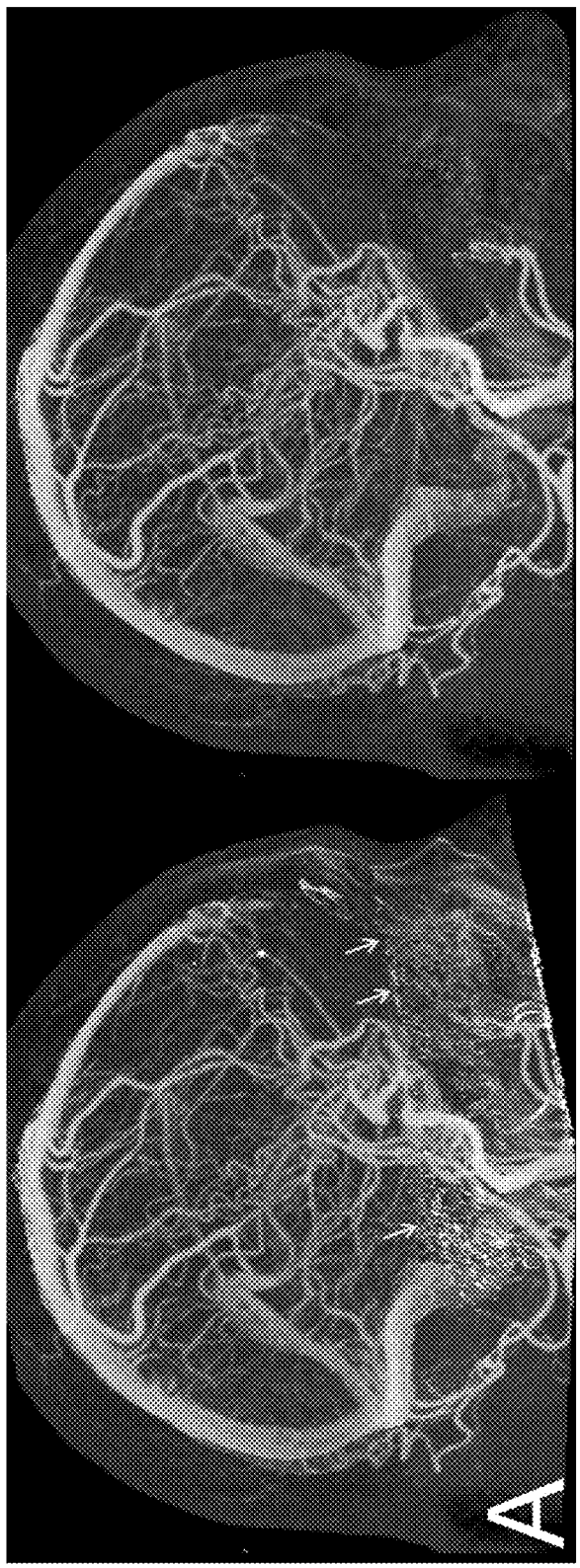
FIGS. 10A-10D illustrate another set of MIP images of the present invention and MIP images of the prior MMBE technique viewed in different directions.
Figure 10B:
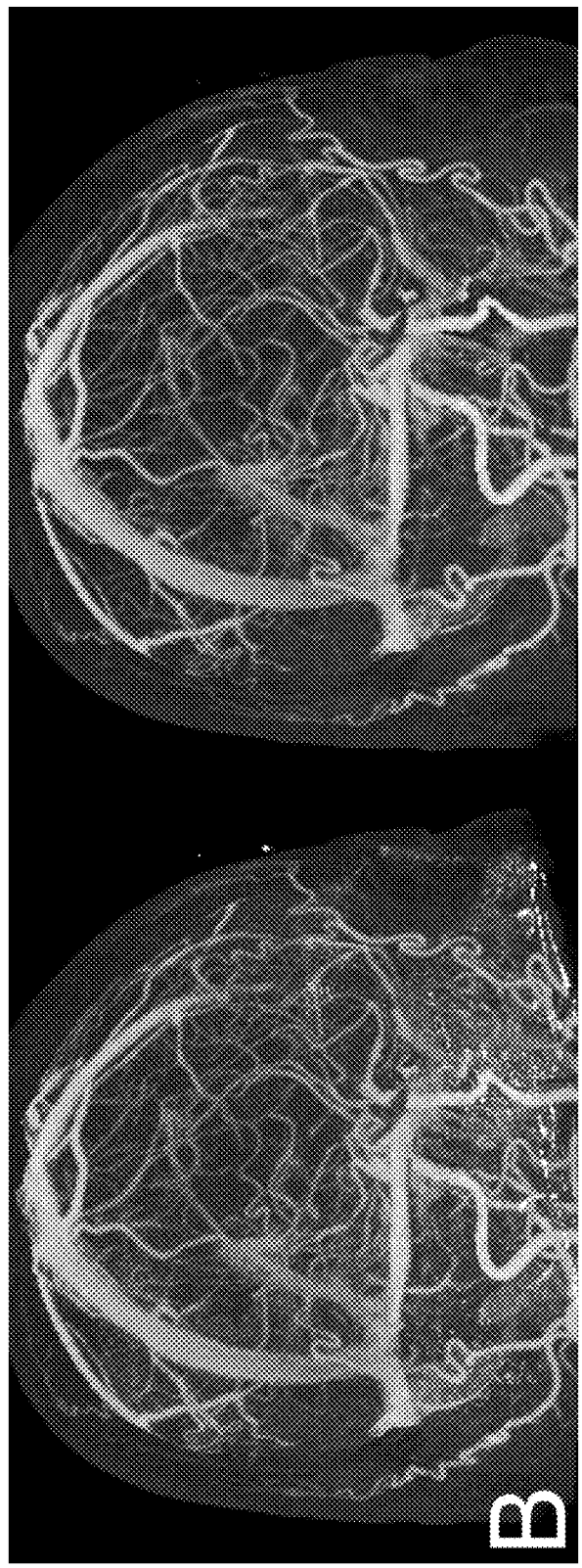
Figure 10C:
Figure 10D:
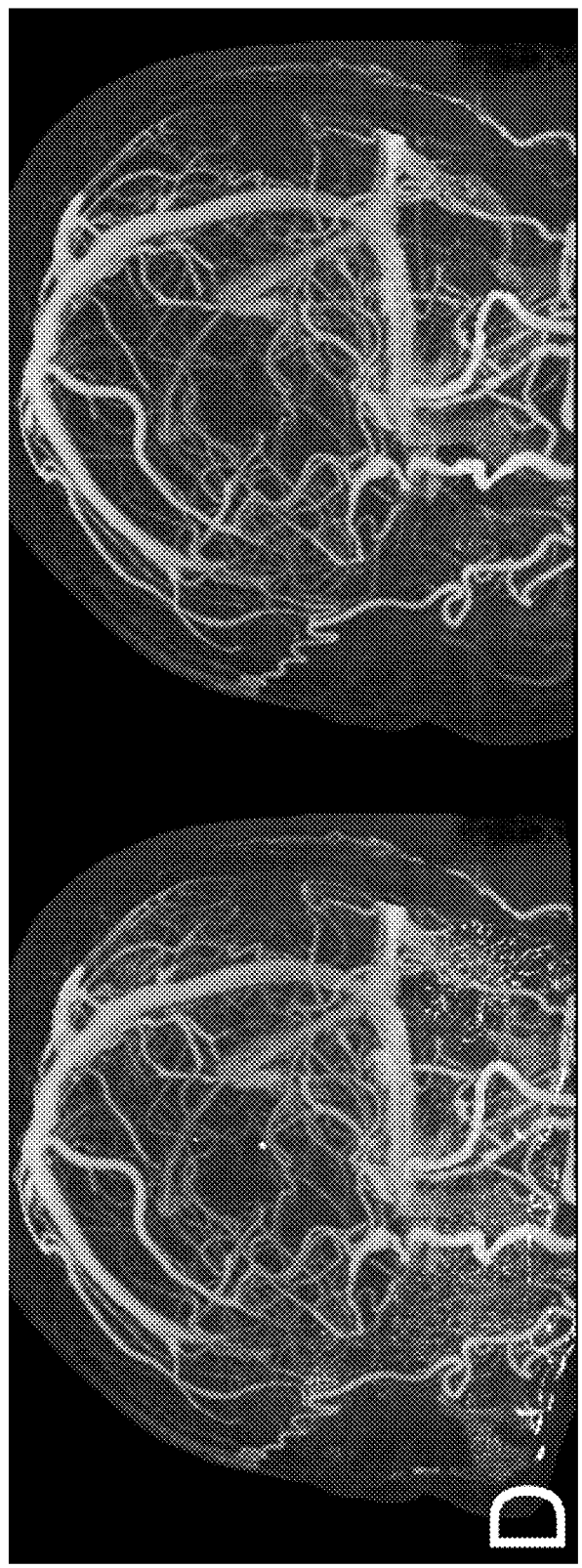

Please refer to FIG. 7, in which the flowchart of the seventh embodiment of the present invention is illustrated. As indicated by step S71 of the figure, a first volume data set is acquired by performing a noncontrast axial CT scan on a subject. As indicated by step S72, a second volume data set is acquired by performing a postcontrast helical CT scan following the injection of a contrast medium into the subject. As indicated by step S73, by reconstructing the first volume data set and the second volume data set, a first 3D image and a second 3D image are acquired, in which the second 3D image possesses a predetermined spatial resolution. As indicated by step S74, a third 3D image is acquired by resampling the first 3D image based on the second 3D image, such that the third 3D image matches the predetermined spatial resolution of the second 3D image. As indicated by step S75, a 3D bone mask is acquired thresholding values of data which are equal to or greater than a scheduled HU in the third 3D image. As indicated by step S76, through the registration of the second 3D image and the third 3D image, the second 3D image and the third 3D image are superimposed, and a transformation matrix for registration is acquired. In step S77, by registering the 3D bone mask and the second 3D image based on the transformation matrix, the 3D bone mask and the second 3D image are superimposed. In the step S78, a bone mask volume data set (in the CT scanner's raw data form) is acquired by analyzing the registered 3D bone mask via computer simulation. In the step S79, a bone-free volume data set is acquired by subtracting the bone mask volume data set from the second volume data set. As indicated by the step S710, the bone-free volume data set is reconstructed to acquire a 3D bone-free image.

Please refer to FIG. 8-11, which illustrate the results of comparison between the bone masks generated by the present invention and by the prior matched mask bone elimination (MMBE) method as well as the comparison of effectiveness between the two methods applied for angiography.

In one preferred embodiment, noncontrast axial CT scans were performed on the heads of 32 patients with acute stroke symptoms (including 11 women and 21 men patients aged between 18 and 80 with a mean age of 58 and a standard deviation of 15) in order to acquire the corresponding first data set of each patient. The noncontrast axial CT scans were performed with 120 kVp, a current between 250-300 mA and a rotation time of 1 second. In order to compare the bone mask generated by the present invention and the bone mask generated by the prior MMBE method, noncontrast helical CT scans were also later performed on the heads of these patients to acquire the corresponding MMBE data set of each patient. The noncontrast helical scans were performed with 100 kVp, 200 mA, the collimation of 32×0.625 mm, the slice pitch of 0.969:1 and the rotation time of 0.4 seconds.

Circulation time was measured by a bolus test with 12 ml of iodinated contrast medium injected and followed by 16 ml of normal saline at a rate of 4 ml/s. It was scanned at a 2-second interval at the level of the ascending aorta so that the time required for peak enhancement can be acquired. The procedure for CTA scan was: injecting a total of 60 ml of iodinated contrast medium at a rate of 4 ml/s and followed by a 35 ml saline flush into the vein of each patient; for detecting arteries and veins simultaneously, the CTA scan was started after a delay time that was the time to peak of a test bolus plus 6 seconds, and was performed on the head of each patient to acquire the corresponding second data set of each patient with 100 kVp, 400 mA, 32×0.625 mm collimation, 0.969:1 pitch and rotation time 0.4 seconds.

The digital data acquired from the CT scans can be organized into the image data set, and the volume data set can be acquired by the application of the image data set, the slice thickness and mathematical operations. For this reason, each first data set can comprise a first image data set and a first volume data set, while each second data set can comprise a second image data set and a second volume data set, and each MMBE data set can comprise a MMBE image data set and a MMBE volume data set.

The plurality of first 2D images, the plurality of second 2D images and the plurality of MMBE 2D images were acquired respectively via the reconstruction of the first image data set, the second image data set and the MMBE image data set. In each image, the matrix size, pixel size and slice thickness were 512×512, 0.4-0.5 mm and 0.625 mm respectively.

The images acquired by different CT scanners differ in pixel size and number, depicting each of the first 2D images and each of the second 2D images in different spatial resolutions. In this embodiment, each of the first 2D images were resampled by using trilinear interpolation, such that a plurality of third 2D images were acquired based on the spatial resolution of each of the second 2D images, thereby aligning the spatial resolution of each respective third 2D image to the same as that of each respective second 2D image with the images being matrices of size 512×512×256.

Images taken by different instruments or by the same instrument but at different times must undergo the process of feature extraction in order to find the relationship between the images by identifying the feature points. The process is known as registration. In this embodiment, the approach taken by Venema et al. in 2001, which involves using the intensity difference between registered voxels as the matching criterion, was adopted. However, to speed up the intensity difference computation, in the embodiment, the intensity difference computation was carried out by selecting a subsample of voxels that had a HU value equal to or greater than 150 (identified as the density of bone mask) from the three representative planes—axial, coronal and sagittal—of the third 2D images. For example, voxels belonging the 80th images (axial plane), the 176th (axial plane) images (counting from the top of the head), and the central sagittal image are selected from the plurality of third 2D images for subsamples (effectively the feature point). The plurality of second 2D images were moved to register with the plurality of third 2D images or the plurality of MMBE 2D images by minimizing the mean of the squared differences of voxel values between the corresponding voxels in the aforementioned bone-mask subsample. Moreover, to register each second 2D image and the respective third 2D image, the optimal matching transformation parameters/matrix (translation and rotation) were acquired by using the downhill simplex method. In the embodiment, in order to resolve the problem which arose from the postural differences between the plurality of second 2D images and the plurality of third 2D images, the downhill simplex method was carried out five times, which requires the reselection of subsample each time. On the other hand, to register each respective second 2D image and each respective MMBE 2D image, the transformation parameters for registration as required by the MMBE method were acquired by adopting the same, aforementioned registration procedure, but only one calculation by downhill simplex method was necessary.

Finally, via the internally developed software, the plurality of 2D images of bone mask were acquired by extracting data from each registered and transformed third 2D image that were equal to or greater than 150 HU. By reconstructing these 2D images of bone mask, the 3D image of bone mask was acquired. On the other hand, the plurality of 2D images of bone mask for the MMBE method were acquired by extracting data from each MMBE 2D image that were equal to or greater than 150 HU, and the MMBE 3D image of bone mask was acquired by reconstructing these the plurality of MMBE 2D mask images.

Please refer to FIG. 8. The figure illustrates the comparison between the bone masks by overlap analysis that generated by the present invention and by the prior MMBE technique. The overlap analysis was as below: 1) using (x,y) respectively to represent the number of voxels concluded in the 3D bone mask of the present invention and in the 3D bone mask of the MMBE technique; 2) using z to represent the number of shared voxels between the 3D bone mask of the present invention and the 3D bone mask of the MMBE technique, such that the overlap rate between the two bone masks can be computed as $z/(x+y-z)$; 3) analyzing the mismatch pattern by loosening the definition of overlapping the bone mask voxels, represented as $z'$, which included voxels within 1 voxel distance (in the 26 grid direction) to the other bone mask, such that the loosened overlap rate can be computed as $z'/(x+y-z)$. The results of overlap analysis were as follows: of the 32 patients, 4 patients moved during scanning, such that the images got from them could not be registered, and therefore, in this embodiment, only the 28 successfully registered patients were taken as subjects of discussion. Among these 28 patients, the individual overlap rate between the two bone masks, $z/(x+y-z)$, ranged from 89.8% to 97% with the mean being 94.6%±2.0%. On the other hand, the individual rate of the loosened overlap rate between the two bone masks fell in the range of 99.2% to 99.9% with the mean being 99.7%±0.2%. Through the overlap analysis, it was verified that the method presented herein and the MMBE method generated similar bone masks. To better illustrate this, FIG. 8A shows one third 2D image of the present invention registered according to the corresponding second 2D image. FIG. 8B shows one MMBE 2D image registered according to the corresponding second 2D image. FIG. 8C demonstrates the superimposed image of bone masks generated from FIG. 8A and FIG. 8B. The overlapped portion is represented in gray; the 3D bone mask of the non-overlapped region of the present invention is represented in white and the 3D bone mask of the non-overlapped region of the MMBE is represented in black. The overlap rate for the two images was 96.1%. FIG. 8D shows the image resulted from representing the loosened overlap region of FIG. 8C in gray, with the loosened overlap rate for the two images being 99.9%.

In another preferred embodiment, the 3D bone masks generated from the present invention and the prior MMBE method were applied to the field of CT angiography, which comprises the following steps: overlapping each respective 2D bone mask and each respective second 2D image by registering the corresponding images based on the previously acquired transformation matrix/parameters for registration; acquiring the plurality of 2D bone-free images by subtracting each of the registered 2D bone mask from the corresponding second 2D image; acquiring 3D bone-free images (3D vascular projection images) under different slices by adopting maximum intensity projection (MIP) to generate a plurality of 2D bone-free MIP images at various viewing angles. On the other hand, the aforementioned methods of subtraction and reconstruction were used to acquire the 3D vascular projection images of the MMBE technique.

In order to assess the diagnostic quality and the noise level of the 3D vascular projection (MIP) image (i.e. 3D bone-free image) generated from the present invention, a visual assessment is adopt to compare the 3D bone-free images generated from the present invention, and the 3D bone-free images generated from the MMBE method in the embodiment. The visual assessment used was as follows: in widow setting of −24 HU, window width of 600 HU, and the same view, the 3D bone-free image of the present invention and the 3D vascular projection image of MMBE were displayed and placed side-by-side. Two neuroradiologists with a professional experience of 4 years and of 23 years, respectively, compared the two types of images. Biases were avoided as these two neuroradiologists were kept from each other's judgment. Sets of images—each consisted of four 3D vascular projection images in random order and arrangement—were presented to the aforementioned neuroradiologists, preventing them from prejudging the outcomes. Using a 5-point scale, the neuroradiologists evaluated the diagnostic qualities and the noise levels of the two types of 3D vascular projection image of a patient. When indicating the diagnostic quality, a score of 3 represented that the diagnostic qualities for the left and right images were equivalent. The lower the score, the diagnostic quality of the left image was judged to be poorer than that of the right image, and the higher the score, the diagnostic quality of the left image was judged to be better than that of the right image. When indicating the noise level, a score of 1 represented that, in the particular set, the left image had a higher noise level and a lower diagnostic value. A score of 2 represented that the left image had a higher noise level but no effect on the diagnostic value. A score of 3 represented equal noise levels for the left and the right images. A score of 4 represented that the left image had a lower noise level but no effect on the diagnostic value. Finally, a score of 5 represented that the left image had a lower noise level and a higher diagnostic value. These scores given to images were complementary; that is, the scores given to images in alternative left/right arrangements always summed up to 6 by design. Finally, the raw scores were transformed into a consistent scoring scale based on positioning the 3D bone-free images of the present invention on the left. The results of visual assessment were as below: for the 28 patients, the two aforementioned neuroradiologists assigned mean diagnostic quality scores in the range of 2.5 to 4 (the average being 3.0±0.3) and mean noise level scores in the range of 1.5 to 3 (the average being 2.5±0.5), which indicated that the bone mask generated from the present invention yielded an effect that is the same with the matched mask bone elimination (MMBE) method in its use in CT angiography.

Please refer to FIG. 9, which illustrates the 3D bone-free images of the present invention and the 3D vascular projection images of the prior MMBE technique in different views. The left images were the 3D bone-free images of the present invention, and the right images were the 3D vascular projection images of the MMBE method. This set of images acquired an average score of 3 in both diagnostic quality and noise level from the two neuroradiologists. In other words, the diagnostic quality and the noise level of the present invention's 3D bone-free images were the same as those of the MMBE's 3D vascular projection images. Furthermore, FIG. 9A-9D were the four 3D vascular projection images, all in different views, and were acquired from subjecting the bone masks in FIG. 8 to the subtraction method and the MIP method. FIG. 9A, 9B, 9C and 9D were the lateral, the left anterior oblique, the anteroposterior and the right anterior oblique directions respectively.

Please refer to FIG. 10. It shows another patient's MIP images of the present invention and MIP images of the prior MMBE technique viewed in different directions. The left images were the 3D bone-free images of the present invention, and the right images were the 3D vascular projection images of the MMBE method. This set of images acquired from the two neuroradiologists an average score of 3 in diagnostic quality and an average score of 2 in noise level. FIG. 10A was the lateral view, FIG. 10B was the left anterior oblique view, FIG. 10C was the anteroposterior view and FIG. 10D was the right anterior oblique view.

Figure 11A:
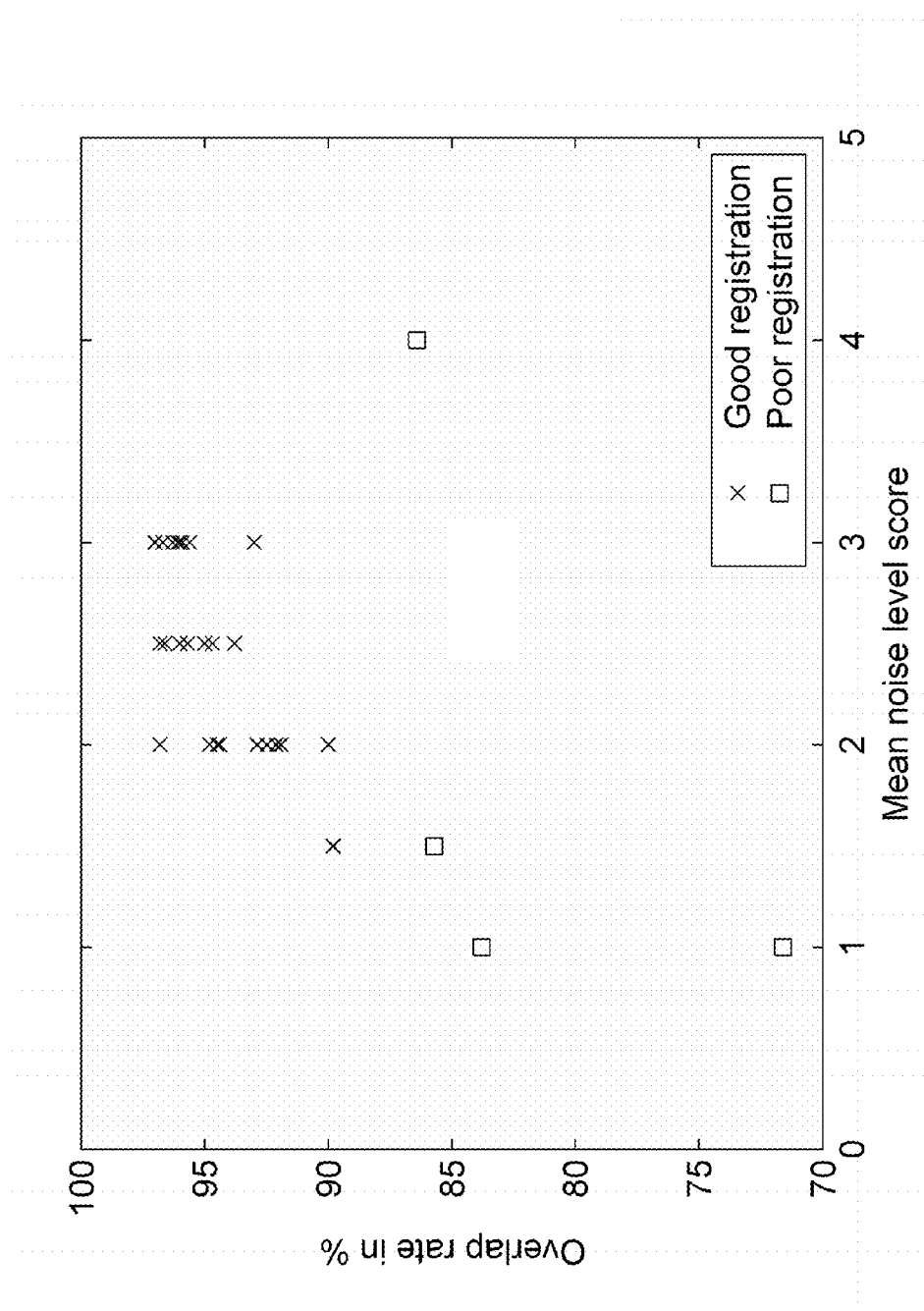
FIGS. 11A and 11B illustrate the correlation between bone masks generated by the present invention and by the prior MMBE method that are plots drawn by plotting the overlap rates on the y-axis, and the mean diagnostic quality or the mean noise level scores on the x-axis.
Figure 11B:
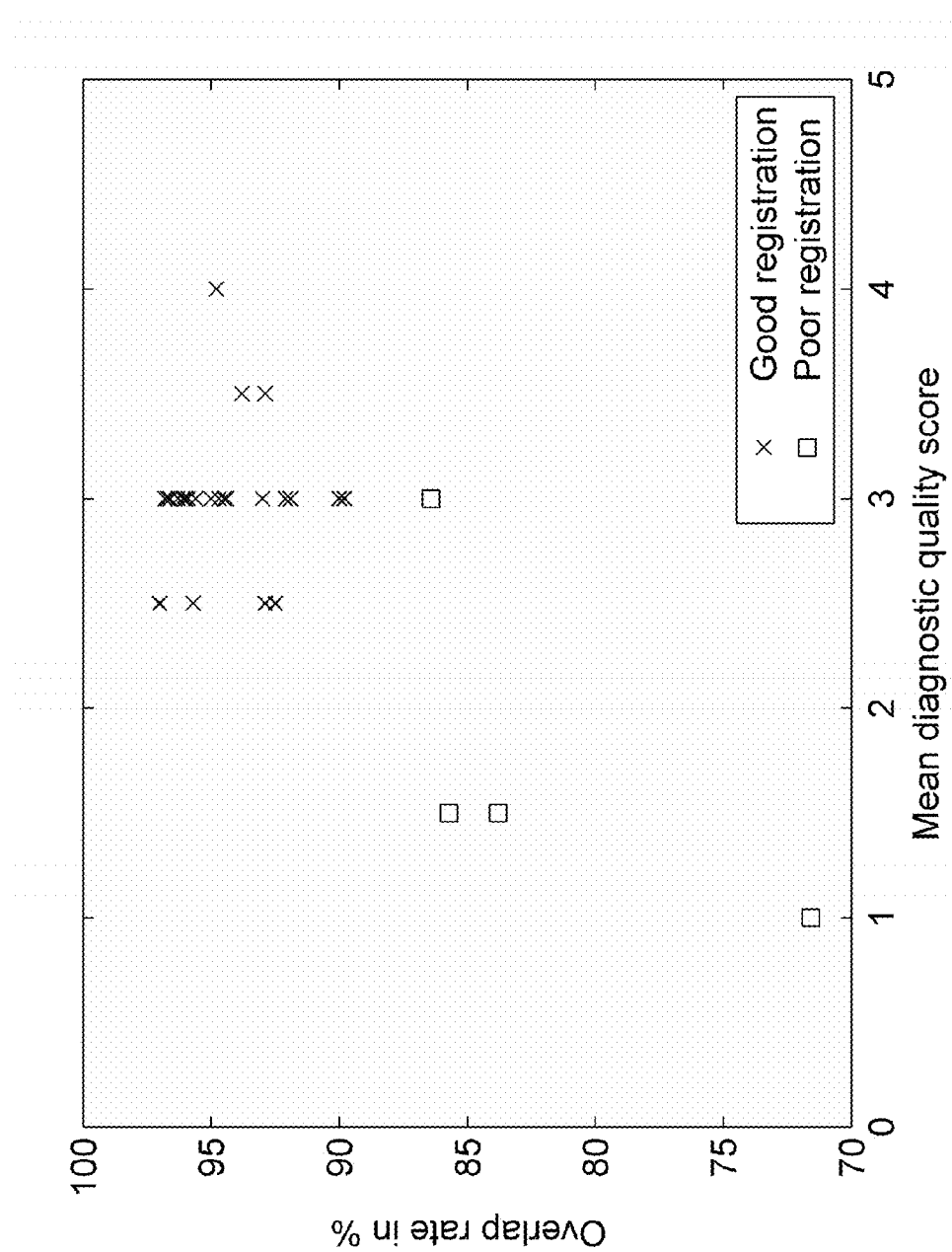

Please refer to FIG. 11, which illustrates the correlation between the overlap rates of the bone masks generated by the present invention and by the prior MMBE method, and the diagnostic quality, noise level. FIG. 11A and FIG. 11B are plots drawn by plotting the overlap rates on the y-axis, and the mean diagnostic quality and the mean noise level scores on the x-axis. From which, FIG. 11A is a diagram between the mean diagnostic quality scores and the overlap rates, in which a 2-tailed test result of P=0.18 showed the diagnostic quality scores did not correlate significantly to the overlap rates. FIG. 11B is a diagram between the mean noise levels and the overlap rates, in which a 2-tailed test result of P<0.001 showed the mean noise levels correlated well with the overlap rates. Next, Cohen's kappa test was carried out to investigate the concordance of the two neuroradiologists' evaluations on the two types of vascular projection images. When kappa=0, the agreement is entirely attributable to chance, and when kappa=1, the scores given by the two observers are showing maximum possible agreement. According to the categories proposed by Landis and Koch, the 6 categories along with the range of κ values are the following: poor (κ<0.10), slight (0.1 κ 0.20), fair (0.21 κ 0.40), moderate (0.41 κ 0.60), substantial (0.61 κ 0.80) and almost perfect (0.81 κ 1) agreement. In this embodiment, Cohen's kappa test with linear weighting revealed a moderate interobserver agreement for image diagnostic quality scores (κ=0.51, 95% CI: 0.24, 0.78), and a moderate level of agreement for noise comparison (κ=0.42, 95% CI: 0.14, 0.70) between the two neuroradiologists. The above results indicated that the two neuroradiologists' evaluations agreed with each other, validating the results of visual evaluation, and in effect, showed that the bone mask generated from the present invention was as effective as that of the MMBE method when applied to CT angiography.

In order to compare the radiation doses used on the subject for generating the bone mask of the present invention and the bone mask of the prior MMBE technique, respectively, in this embodiment, the total radiation exposure or the absorbed radiation dose of a patient was assessed by using the dose-length product (DLP) method. Furthermore, the potential stochastic risk of the subject that is being exposed to radiation was assessed by the effective dose. When the field of view was uniformly set at 16 cm, the assessment results were as follows: the DLP of 1066.06 mGy and effective dose of 2.24 mSv for the noncontrast axial CT scan; the DLP of 179.82 mGy and effective dose of 0.28 mSv for the noncontrast helical CT scan; and the DLP of 373.20 mGy and effective dose of 0.78 mSv for the postcontrast helical CT scan. From the above results, it was known that the effective dose for the prior MMBE method was 1.16 mSv. If the images acquired from the noncontrast axial CT scan (i.e. the first reconstruction images), which was carried out for the purpose of diagnosing the type of stroke of a patient, can be used as the bases for generating a bone mask, the additional noncontrast helical CT scan can be omitted from the angiography process to reduce the effective dose by 33% (from 1.16 mSv to 0.78 mSv by omitting the noncontrast helical CT scan), proving that using the present invention to generate the bone mask can reduce the radiation dose endured by the subject.

All that are described above are exemplary and not restrictive in any way of the present invention. Effectively, any revisions, modifications or variations that fall within the spirit and broad scope of the present invention should all be covered by the appended patent claims.

What is claimed is:

1. A method for generating a bone mask, comprising the following steps:
   performing a noncontrast axial computed tomography (CT) scan on a subject to acquire a first data set;
   performing a postcontrast helical CT scan on the subject after the subject injected with a contrast medium to acquire a second data set;
   reconstructing the first data set and the second data set to acquire a first reconstruction image and a second reconstruction image respectively, in which the second reconstruction image possesses a predetermined spatial resolution;
   resampling the first reconstruction image based on the second reconstruction image to acquire a third reconstruction image, such that the third reconstruction image matches the predetermined spatial resolution of the second reconstruction image; and
   thresholding values of data which are equal to or greater than a scheduled Hounsfield Unit (HU) in the third reconstruction image to acquire a bone mask.

2. The method as recited in claim 1, wherein the first data set is a first image data set and the second data set is a second image data set.

3. The method as recited in claim 2, wherein the first reconstruction image is a plurality of first two-dimension (2D) images, the second reconstruction image is a plurality of second 2D images, the third reconstruction image is a plurality of third 2D images, and the bone mask is a plurality of 2D bone masks.

4. The method as recited in claim 1, wherein the first data set is a first volume data set and the second data set is a second volume data set.

5. The method as recited in claim 4, wherein the first reconstruction image is a first three dimension (3D) image, the second reconstruction image is a second 3D image, the third reconstruction image is a third 3D image, and the bone mask is a 3D bone mask.

6. The method as recited in claim 1, further comprising the following steps:
 registering the second reconstruction image and the third reconstruction image to superimpose the second reconstruction image and the third reconstruction image, and to acquire a transformation matrix for registration; and
 registering the bone mask and the second reconstruction image based on the transformation matrix to superimpose the bone mask and the second reconstruction image.

7. The method as recited in claim 6, further comprising the step of subtracting the data matched with the registered bone mask in the second reconstruction image to acquire a bone-free reconstruction image.

8. The method as recited in claim 6, further comprising the following steps:
 analyzing the registered bone mask by computer simulation to acquire a bone mask data set;
 subtracting the bone mask data set from the second data set to acquire a bone-free data set; and
 reconstructing the bone-free data set to acquire the bone-free reconstruction image.

9. The method as recited in claim 8, wherein the bone mask data set is a bone mask image data set and the bone-free data set is a bone-free image data set.

10. The method as recited in claim 9, wherein the bone-free reconstruction image is a plurality of 2D bone-free images.

11. The method as recited in claim 8, wherein the bone mask data set is a bone mask volume data set and the bone-free data set is a bone-free volume data set.

12. The method as recited in claim 11, wherein the bone-free reconstruction image is a 3D bone-free image.

13. The method as recited in claim 6, wherein a downhill simplex method is adopted for registration to superimpose the second reconstruction image and the third reconstruction image.

14. The method as recited in claim 1, wherein trilinear interpolation is adopted for resampling the first reconstruction image in order to acquire the third reconstruction image, such that the third reconstruction image matches the predetermined spatial resolution of the second reconstruction image.

15. The method as recited in claim 1, wherein the contrast medium comprises an iodinated contrast medium.

16. The method as recited in claim 1, wherein the scheduled Hounsfield unit is in the range of 150 to 300 HU.

17. The method as recited in claim 1, wherein the predetermined spatial resolution is defined by the predetermined pixel size, by the slice thickness and by the pattern corresponding to the pixel.

18. The method as recited in claim 1, wherein in the thresholding step, the periphery of the bone mask is color-marked.

* * * * *